United States Patent

Hammond et al.

[15] 3,660,644
[45] May 2, 1972

[54] SYSTEM FOR SUMMATION TOTALIZING FOR NET OIL ANALYZERS AND FLOW ANALYZERS

[72] Inventors: Jack Hammond; Charles L. Boyd, both of Duncan, Okla.
[73] Assignee: Halliburton Company, Duncan, Okla.
[22] Filed: Dec. 29, 1969
[21] Appl. No.: 888,651

[52] U.S. Cl. .................. 235/92 PL, 235/92 R, 235/92 FL, 235/151.34, 235/92 EC
[51] Int. Cl. ........................... G06m 3/12, B65g 51/36
[58] Field of Search .......... 235/92 FL, 92 EC, 92 CA, 92 PS

[56] References Cited

UNITED STATES PATENTS

| | | |
|---|---|---|
| 3,376,744 | 4/1968 | Kister .................. 235/92 FL |
| 3,471,852 | 10/1969 | Floyd .................. 235/92 EC |
| 3,331,006 | 7/1967 | Strand .................. 235/92 CA |
| 3,302,005 | 1/1967 | Farnsworth .................. 235/92 R |

Primary Examiner—Maynard R. Wilbur
Assistant Examiner—Robert F. Gnuse
Attorney—Burns, Doane, Swecker & Mathis and John H. Tregoning

[57] ABSTRACT

Method and apparatus for determining the total volume of water extracted from an oil/water separator by summing, without any loss of pulses due to the coincidence thereof, the pulses generated by a flowmeter in the free water knockout conduit with the pulses generated by a net oil analyzer indicative of water flow in the oil/water emulsion conduit.

7 Claims, 3 Drawing Figures

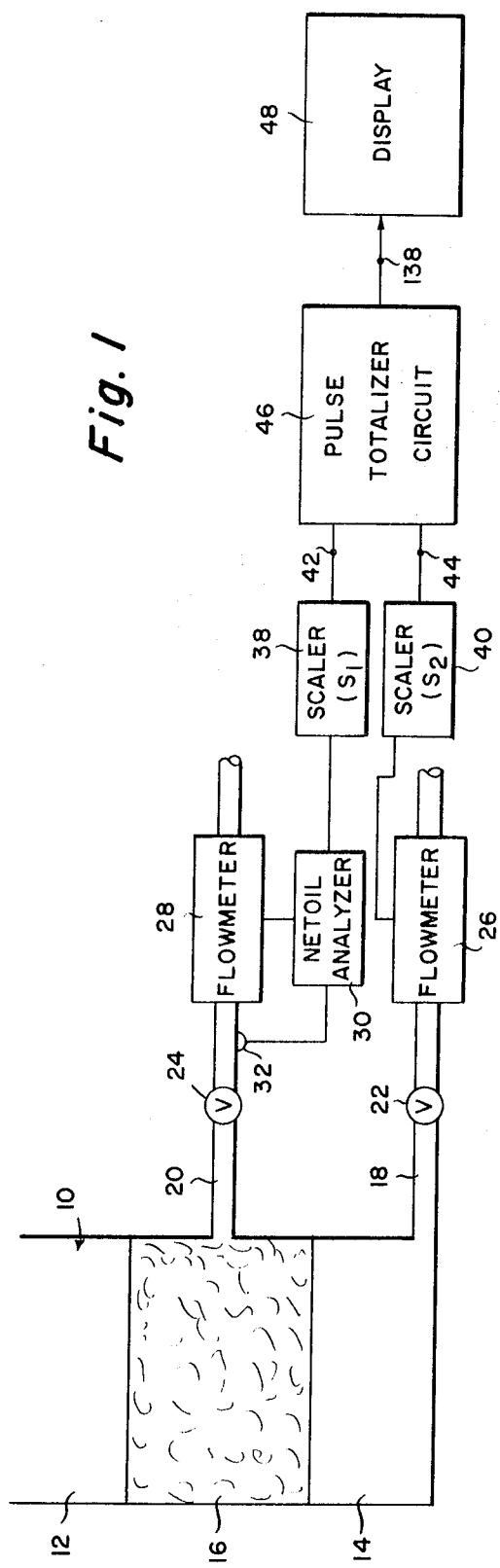
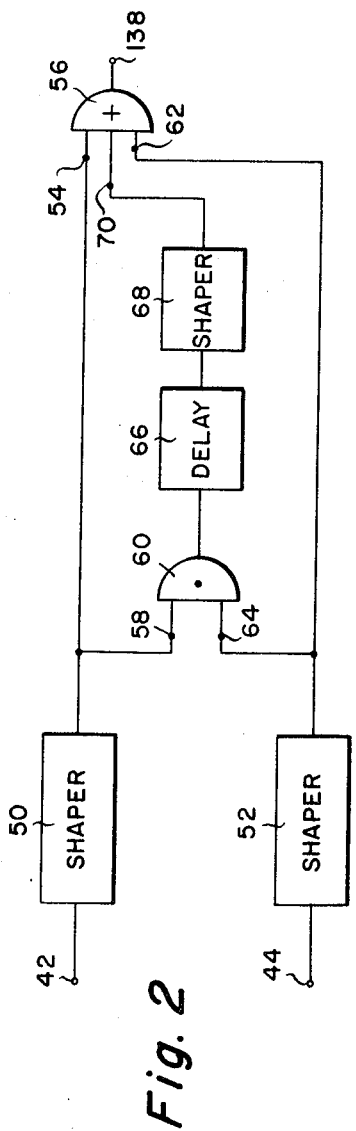

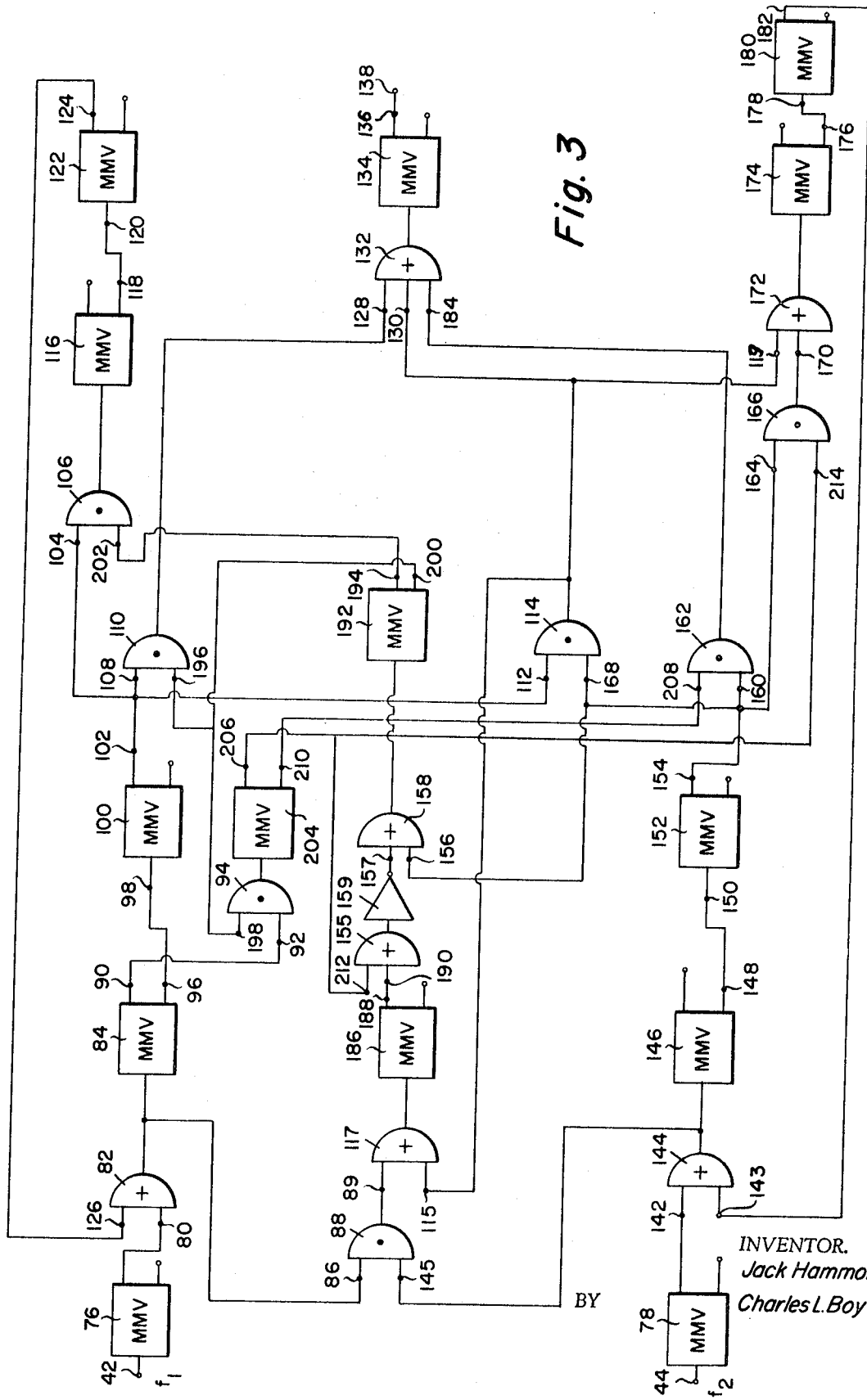

SYSTEM FOR SUMMATION TOTALIZING FOR NET OIL ANALYZERS AND FLOW ANALYZERS

BACKGROUND OF THE INVENTION

The present invention relates to a method and apparatus for totalizing the pulses in two series of electrical pulses, and more particularly, to a method and apparatus for manifesting the volume of water extracted from an oil/water separator into which the production fluid from an oil well is dumped.

Normally, the oil well production fluid is piped into an oil/water separator for separation thereof into its primary constituents, namely, oil and water. Because of the relative densities of these constituents substantially pure water settles in the lowermost region of the separator and substantially pure oil floats in the uppermost region of the separator. Due, however, to the difficulty in speedily accomplishing the separation, an emulsion of oil and water is also generally derived from the separator. This emulsion is derived from an intermediate region separating the regions of substantially pure oil and water.

The substantially pure oil may be pumped to a tank or reservoir for storage and the emulsion may be pumped into a separate reservoir for further separation. The substantially pure water or free water may then be returned to the ground together with the addition of sufficient water to equalize the volumes of extracted and returned fluids.

For example, to prevent the settling of the ground in populated areas, some regulatory agencies require that the fluid returned to the ground be equal in volume to the fluid extracted therefrom. In the secondary recovery of crude oil, that is, where the oil field is near depletion, it may also be necessary to maintain the subsurface pressure by pumping water into the ground as the production fluid is removed.

It may also be advantageous to maintain the level of the subsurface water in order to keep the oil/water interface at substantially the same level with respect to the well casing of a producing well. The casing is initially perforated in the vicinity immediately above the oil/water interface and, for best results, it is desirable to maintain the same level of the interface with respect to the casing by maintaining the same water level. One way this can be accomplished is by determining precisely the amount of water which is removed from the ground in the production fluid and replacing the same amount of water.

In any of the previously described situations, since the total volume of production fluid is easily ascertained, the total volume of fluid needed to replace the extracted fluid is likewise easily ascertained. However, since a portion of the production fluid is water and will be returned to the subsurface reservoir, it is necessary to determine the volume of water being returned in this manner in order to determine the amount of additional water required to make up the required volume.

A typical three-phase oil/water separator into which the production fluid is pumped will contain three distinct regions after a settling period. Since two of the regions contain water, i.e., the free water or substantially pure water region and the oil/water emulsion region, it is necessary to totalize the volume of water flowing from both regions if an accurate total water indication is to be obtained. An indication of the free water flowing in the free water outlet conduit provided on the separator may be obtained by providing therein a flow meter of the type illustrated and claimed in the Groner et al. U.S. Pat. No. 3,164,020, assigned to the assignee of the present invention. An indication of the water contained in the fluid flowing in the oil-water emulsion fluid outlet conduit may be obtained by providing therein a net oil analyzer of the type illustrated and claimed in the copending U.S. application, Ser. No. 750,675 now U.S. Pat. No. 3,566,685 of Zimmerman et al., assigned to the assignee of the present invention.

It is, of course, desirable to have free water and emulsion flowing in their respective conduits simultaneously in order to make most efficient use of the oil/water separator. It is thus necessary to combine the output signals from the flow meters associated with each fluid conduit to provide an indication of total water. Since the types of meters previously mentioned provide independent digital or pulse signals, i.e., asynchronous digital signals, it is necessary to provide circuitry intermediate the meters and a common counter to ensure accurate counting of the pulses without any loss thereof should an output pulse from one meter overlap an output pulse from the other meter or be applied to the counter in a time framework too small for the counter to separately respond.

It is, therefore, an object of the present invention to provide a novel method and apparatus for totalizing the volume of water being extracted from a three-phase oil/water separator.

A further object is to provide a novel method and pulse totalizer apparatus for counting pulses from a plurality of sources regardless of their application time relationship.

Another object is to provide a novel method and pulse totalizer apparatus for detecting the coincidence of pulses from a plurality of sources to thereby ensure the recording of multiple pulses when coincidence occurs.

Yet another object is to provide a novel method and pulse totalizer apparatus which recirculates all but one of coincidence pulses for later counting in response to the detection of coincidence between pulses.

These and other objects and advantages of the present invention will be readily apparent to one skilled in the art to which the invention pertains from a perusal of the claims and the following detailed description when read in conjunction with the appended drawings.

THE DRAWINGS

FIG. 1 is a functional block diagram of the present invention;

FIG. 2 is a functional block diagram of a first embodiment of the pulse totalizer circuit of FIG. 1; and FIG. 3 is a functional block diagram of a second embodiment of the pulse totalizer of FIG. 1.

THE DETAILED DESCRIPTION

With reference to FIG. 1, an oil/water separator is illustrated as including a reservoir 10 into which the production fluid of an oil well may be piped. The separator may be conventional in construction and operation to form, from the production fluid, three distinct regions within the reservoir 10, the uppermost region 12 containing substantially pure oil, the lowermost region 14 containing substantially pure water and the intermediate region 16 containing an emulsion of oil and water.

The separator reservoir 10 may be provided with first and second fluid outlet conduits 18 and 20 on a vertical wall thereof to provide for the discharge of fluid from the free-water region 14 and from the oil/water emulsion region 16, respectively. The flow of fluid through the conduits 18 and 20 may be controlled by conventional valves 22 and 24, respectively.

A pair of conventional turbine type fluid flowmeters 26 and 28 may be provided, respectively, in the free-water outlet conduit 18 and in the emulsion outlet conduit 20 to generate two series of electrical pulses at a frequency or pulse repetition rate related to the rate of fluid flow therethrough. The flowmeters 26 and 28 may, by way of example, be of the type illustrated and claimed in the aforementioned Groner U.S. Pat. No. 3,164,020 assigned to the assignee of the present invention.

The output signal of the flowmeter 28 may be applied to a net oil analyzer 30 having a capacitance probe 32 disposed in the emulsion outlet conduit 20. The net oil analyzer may be of the type illustrated and claimed in the aforementioned copending U.S. application Ser. No. 750,675 of Zimmerman et al. and assigned to the assignee of the present invention. The output signal from the net oil analyzer 30 may thus be a series of electrical pulses having a frequency or pulse repetition rate related to the volume of water in the emulsion flowing through the fluid conduit 20.

The output signals from the flowmeter 26 and from the net oil analyzer 30 may be applied to the input terminals of suitable conventional scalers 38 and 40, respectively. The output signals of the conventional scalers 38 and 40 may in turn be applied, respectively, to the input terminals 42 and 44 of the pulse totalizer circuit 46 subsequently described in conjunction with FIGS. 2 and 3. The output signal from the pulse totalizer circuit 46 may be applied to any suitable and conventional display device 48.

In operation, the oil well production fluid containing both crude oil and water is pumped into the reservoir 10 of the oil/water separator where it separates in a well known manner because of the relative densities of the constituents of the production fluid into three regions, i.e., oil, oil/water emulsion, and free-water. The valves 22 and 24 may be manually or automatically opened to allow free-water to flow through the flowmeter 26 in the conduit 18 and to allow the oil/water emulsion to flow through the flowmeter 28 in the emulsion conduit 20.

The series of electrical pulses having a frequency related to the flow of free-water generated by the flow meter 26, and the series of electrical pulses having a frequency related to the flow of the water present in the emulsion generated by the net oil analyzer 30, may be applied to the scalers 38 and 40 to adjust for differences in the calibration factors of the flowmeters 26 and 28, i.e., the number of pulses generated per unit of fluid flow. The scaling may, of course, be accomplished in any suitable and conventional manner such as by a number of serially connected bistable elements.

The output signals from the scalers 38 and 40 may be applied to the pulse totalizer circuit 46 where the pulses related to the net water in the emulsion are totaled with the pulses related to the free-water in the manner hereinafter described in conjunction with FIGS. 2 and 3. The display device 48 provides a visual indication of the number of pulses applied thereto, i.e., the total water extracted from the oil/water separator.

Referring to the embodiment of the pulse totalizer 46 illustrated in FIG. 2, the first and second series of pulses from the scalers 38 and 40 may be applied, respectively, to the input terminals 42 and 44 of a pair of conventional pulse shapers 50 and 52. The shaped output pulses from the shaper 50, for example, a monostable multivibrator, may be applied to an input terminal 54 of a three input terminal OR gate 56 and to an input terminal 58 of a two-input terminal AND gate 60. The output signal from the shaper 52 may be applied to a second input terminal 62 of the OR gate 56 to the second input terminal 64 of the AND gate 60. The output signal from the AND gate 60 may be applied to a conventional pulse delay circuit 66 and the delayed output signal therefrom shaped in a conventional pulse shaper 68 and applied to the third input terminal 70 of the OR gate 56. The output signal of the OR gate 56 may be applied to the input terminal 138 of the display device 48 illustrated and described in connection with FIG. 1.

In operation, a first series of pulses related to the flow of water in the emulsion is applied to the shaper 50 which provides an output pulse of a predetermined duration, e.g., 60 milliseconds. The shaped pulses may be applied to a conventional display device by way of the OR gate 56 and may also be applied to the AND gate 60. Likewise, a second series of electrical pulses is applied to the shaper 52 which provides an output pulse of approximately the same duration as that provided by the shaper 50 for each input pulse applied thereto. The duration or width of the shaped pulses is desirably quite small so as to reduce the likelihood of coincidence. This output pulse may likewise be applied to a conventional display device by way of the OR gate 56 and to the input terminal 64 of the AND gate 60.

If a pulse of the first series of electrical pulses is coincident with a pulse of the second series of electrical pulses, a single pulse will result at the output terminal 138 of the OR gate 56. However, the coincidence will be detected at the AND gate 60 and will cause a delayed and shaped pulse to be applied to the OR gate 56. Since the delay provided by the conventional delay circuit 66 exceeds the duration of the shaped pulses, e.g., 70 milliseconds, the delayed and shaped pulse arrives at the OR gate 56 after the shaped pulse has been passed to the display device 48. Thus, when coincidence occurs between any two pulses of the first and second series of pulses, a first pulse is passed to the display device 48 and a second pulse is generated and passed to the display device at a later time. Of course, if coincidence does not occur, the pulses of the first and second series of pulses are separately passed to the display device 48 by way of the OR gate 56 as they arrive at this gate. In this event, no pulse will be passed by the AND gate 60.

Referring now to the second embodiment of the pulse totalizer 46 of FIG. 1 illustrated in FIG. 3, the first and second series of pulses from the scalers 38 and 40 of FIG. 1 may be applied, respectively, to the trigger input terminals 42 and 44 of the monostable or one-shot multivibrators 76 and 78. The output signal from the binary ONE output terminal of the monostable multivibrator 76 may be applied to an input terminal 80 of a two-input terminal OR gate 82 which is in turn connected both to the trigger input terminal of a monostable or one-shot multivibrator 84 and to an input terminal 86 of a two input terminal AND gate 88.

The binary ONE output terminal 90 of the monostable multivibrator 84 may be connected to an input terminal 92 of a two-input terminal AND gate 94. The binary zero output terminal 96 of MMV84 may be connected to the trigger input terminal 98 of a monostable or one-shot multivibrator 100. The binary ONE output terminal 102 of the multivibrator 100 may be connected in turn to an input terminal 104 of a two-input terminal AND gate 106, to an input terminal 108 of a two-input terminal AND gate 110, and to an input terminal 112 of a two-input terminal AND gate 114.

The output signal from the AND gate 106 may be applied to the trigger terminal of a monostable or one-shot multivibrator 116 whose binary ZERO output terminal 118 may be connected to the trigger input terminal 120 of a monostable or one-shot multivibrator 122. The binary ONE output terminal 124 of the monostable multivibrator 122 may be connected to the second input terminal 126 of the OR gate 82.

Similarly, the output signal from the binary ONE output terminal of the multivibrator 78 may be applied to an input terminal 142 of a two-input terminal OR gate 144 and the output signal therefrom may be applied to an input terminal 145 of the AND gate 88 and to the trigger input terminal of a monostable or one-shot multivibrator 146. The binary ZERO output terminal 148 of the multivibrator 146 may be connected to the trigger input terminal 150 of a monostable or one-shot multivibrator 152. The binary ONE output terminal 154 of the multivibrator 152 may be connected to an input terminal 156 of a two-input terminal AND gate 158, to an input terminal 160 of the AND gate 162, to an input terminal 164 of a two-input terminal AND gate 166, and to an input terminal 168 of the AND gate 114.

The output signal from the AND gate 162 may be applied to an input terminal 184 of the three-input terminal OR gate 132 to which the output signals from the AND gate 110 and gate 114 may also be applied. The output signal of the OR gate 132 may be connected to the trigger input terminal of a monostable or one-shot multivibrator 134 and the signal taken from the binary ONE output terminal 136 thereof applied to the input terminal 138 of the display circuit 48 of FIG. 1.

The output signal from the AND gate 88 may be applied to an input terminal 89 of a two-input terminal OR gate 117 to which the output signal from the AND gate 114 is also applied by way of an input terminal 115. The output signal from the OR gate 117 may be applied to the trigger input terminal of a monostable or one-shot multivibrator 186 and the signal from the binary ONE output terminal 188 thereof applied to an input terminal 190 of a two-input terminal OR gate 155. The output signal from the OR gate 155 may be applied to an input terminal 157 of the AND gate 158 by way of a conventional inverter 159. The output signal from the AND gate 158 may be applied to the trigger input terminal of a monostable or one-shot multivibrator 192, the binary ZERO output terminal 200 thereof being connected to an input terminal 196 of the AND gate 110 and to an input terminal 198 of the AND gate 94, and the binary ONE output terminal 194 thereof being connected to an input terminal 202 of the AND gate 106.

The output signal from the AND gate 94 may be applied to the trigger input terminal of a monostable or one-shot multivibrator 204, the binary ZERO output terminal 210 thereof being connected to an input terminal 208 of the AND gate 162, and the binary ONE output terminal 206 thereof being connected to an input terminal 212 of the OR gate 155 as well as to an input terminal 214 of the AND gate 166.

The output signal from the AND gate 166 may be applied to an input terminal 170 of a two-input terminal OR gate 172 to which the output signal from the AND gate 114 may also be applied by way of the input terminal 119. The output signal from the OR gate 172 may be applied to the trigger input terminal of a monostable or one-shot multivibrator 174 where the binary ZERO output terminal 176 may in turn be connected to the trigger input terminal 178 of a monostable or one-shot multivibrator 180. The binary ONE output terminal 182 of the multivibrator 180 may be connected to an input terminal 143 of the OR gate 144.

In operation, the first and second series of pulses, $f1$ and $f2$ respectively, are shaped in the multivibrators 76 and 78, and the shaped pulses in the first series of electrical pulses then applied by way of the OR gate 82 to a delay circuit comprising the monostable multivibrators 84 and 100. The delayed pulses in the signal appearing at the binary ONE output terminal 102 of the multivibrator 100 may then be applied by way of the AND gate 110, if enabled, and the OR gate 132 and the multivibrator 134 to the display 48 of FIG. 1.

The pulses in the second series of pulses are shaped in the multivibrator 78 and applied by way of the OR gate 144 to a second delay network comprising the multivibrators 146 and 152. The time constants of the multivibrators 146 and 152 are desirably greater than the time constants of the multivibrators 84 and 100 so that the pulses in the second series of electrical pulses will be delayed for greater period of time than the pulses in the first series of electrical pulses.

The delayed pulses in the second series of pulses appearing at the binary ONE output terminal 154 of the multivibrator 152 may be applied by way of the AND gate 162, if enabled, and the OR gate 132 and multivibrator 134 to the display 48 of FIG. 1.

The delayed pulses in the first series of pulses may also be applied by way of AND gate 106, if enabled, to the multivibrators 116 and 122 for delay and for recirculation through the OR gate 82. The delayed pulses in the second series of pulses may also be applied by way of the AND gate 166, if enabled, and the OR gate 172 to the multivibrators 174 and 180 for delay and for recirculation through the OR gate 144.

Since the two input terminals 196 and 208 of the AND gates 110 and 162, respectively, are connected to the normally high binary ZERO output terminals 200 and 210 of the multivibrators 192 and 204, respectively, these AND gates 110 and 162 are normally enabled and will pass any binary ONE pulses appearing at their respective input terminals 108 and 160. The respective input terminals 202 and 214 of the AND gates 106 and 166 are connected to the normally low binary ONE output terminals 194 and 206 of the monostable multivibrators 192 and 204, respectively, and are thus normally inhibited. The pulses in the first and second series of electrical pulses are thus normally applied by way of the AND gates 110 and 162 and the OR gate 132 to the display 48 of FIG. 1.

The output signals from the OR gates 82 and 144 are, however, also applied to the input terminals 86 and 145, respectively, of the AND gate 88. The AND gate 88 thus provides an output pulse upon coincidence of the triggering of the multivibrators 84 and 146 and this pulse is shaped in the multivibrator 186, passed through the OR gate 155, and inverted by the inverter 159 to inhibit the AND gate 158. The triggering of the multivibrator 192 is thus inhibited and the AND gates 106 and 110 remain respectively in their inhibited and enabled conditions. Upon pulse coincidence then, the pulse in the first series of pulses $f1$ is passed through the OR gate 132 to be counted and the recirculation of that pulse back to the OR gate is inhibited.

In addition, since the normally high binary ZERO output terminal 200 of the multivibrator 192 is connected to the input terminal 198 of the AND gate 94, the AND gate 94 remains enabled. Therefore, when the multivibrator 84 returns to its normal state, a positive pulse, applied by way of the enabled AND gate 94, triggers the multivibrator 204. The binary ONE output terminal 206 and the binary ZERO output terminal 210, now low and high respectively, inhibit the AND gate 162 and enable the AND gate 166, respectively, for a predetermined period of time. Since the delayed pulse of the second series of pulses arrives after the triggering of the multivibrator 204, counting of the pulse is prevented by the inhibited AND gate 162 and the pulse is recirculated by way of the now enabled AND gate 166 to the OR gate 144 for later counting.

Similarly, coincidence of the delayed pulses in the first and second series of pulses is detected by the AND gate 114 and the output pulse which results therefrom is applied through the OR gate 117 to trigger the multivibrator 186. Thus, if coincidence of the triggering of the multivibrators 84 and 146 is detected by either the AND gate 88 or coincidence of the delayed pulses is detected by the AND gate 114, the monostable multivibrator 186 will be triggered to inhibit the AND gate 158 by way of the OR gate 155 and the inverter 159 for the duration of the multivibrator 186 pulse. The multivibrator 192 thus cannot be triggered by a delayed pulse in the second series of pulses when it is applied to the input terminal 156 of the AND gate 158 during this period. Thus, one pulse is counted and one pulse is recirculated.

To assure that one pulse is counted and one pulse is recirculated when exact coincidence of the delayed pulses occurs, the output pulse from the AND gate 114 is passed through the OR gate 132 to be counted, and is also applied to the OR gate 172 to be recirculated to the OR gate 144. Thus, proper operation is assured irregardless of slight gating transient time variations.

When, however, neither condition of coincidence occurs and a pulse of the first series of pulses precedes a pulse of the second series of pulses, the triggering of the multivibrator 204 and the resultant inhibiting of the AND gates 158 and 162 and the enabling of the AND gate 166 for a predetermined period of time provide for the counting of the pulse of the first series of electrical pulses and the recirculation of any pulses of the second series of pulses which arrive during this predetermined period of time.

In similar fashion, if a delayed pulse in the first series of electrical pulses precedes a delayed pulse in the second series of electrical pulses, the AND gate 94 remains enabled by the normally high binary ZERO output signal of the multivibrator 192 for a time sufficient to pass the positive going edge of the binary ZERO output signal from the multivibrator 84, thereby triggering the multivibrator 204. The AND gate 166 is thus enabled and the AND gate 162 inhibited. The pulse of the first series of pulses is thus passed through the OR gate 132 to be counted and the pulse of the second series of pulses is recirculated back to the OR gate 144.

Although the delayed pulse of the second series of pulses triggers the multivibrator 192 when it arrives at the binary ONE output terminal 154 of the multivibrator 152, the counting of the pulse of the first series of pulses and the recirculation of the pulse of the second series of pulses is not affected since the pulse of the first series of pulses will have previously been counted and the multivibrator 204 will have previously been triggered to inhibit and enable the AND gates 162 and 166, respectively, for the duration of the multivibrator 204 pulse.

However, if the delayed pulse of the second series of pulses precedes the delayed pulse of the first series of pulses, the multivibrator 192 is triggered by the delayed pulse of the second series of pulses, thus inhibiting the AND gate 94 and the AND gate 110 and enabling the AND gate 106. Since the multivibrator 204 cannot be triggered when the pulse of the first series of pulses arrives, the pulse of the second series of pulses is passed by the normally enabled AND gate 162 and the OR gate 132 to be counted while the pulse of the first series of pulses is recirculated to the OR gate 82.

The operation of the circuit of FIG. 3 may be more clearly understood with reference to the following example. Assume that the pulses of the first series of pulses are delayed approximately 5 microseconds each by the multivibrators 84 and 100, and that the pulses of the second series of pulses are delayed approximately 10 microseconds each by the multivibrators 146 and 152. If a shaped pulse of the first series of pulses arrives in an overlapping relation to a shaped pulse in the second series of electrical pulses at the respective trigger inputs of the multivibrators 84 and 146, or if a pulse of the second series of pulses precedes a pulse of the first series of pulses by exactly 5 microseconds, coincidence is detected respectively by the AND gates 88 and 114. The multivibrator 192 cannot be triggered because of the inhibiting of the AND gate 158 for the duration of the output pulse from the multivibrator 186 which may be, for example, 60 milliseconds. Thus, one pulse is counted and one pulse is recirculated as previously described.

If, however, a pulse of the second series of pulses precedes a pulse of the first series of pulses by more than 5 microseconds, the multivibrator 192 is triggered prior to the triggering of a multivibrator 204, and the pulse of the second series of pulses is passed to be counted while the pulse of the first series of pulses is recirculated to the OR gate 82, as previously described.

Finally, whenever a pulse of the first series of pulses precedes a pulse of the second series of pulses, the multivibrator 204 is triggered prior to the triggering of the multivibrator 192 and the pulse of the first series of pulses is passed to be counted while the pulse of the second series of pulses is recirculated to the OR gate 144. Since each of the recirculated pulses in the previous examples is delayed for a period of time, e.g., 65 milliseconds, exceeding the duration of the inhibit/enable multivibrators 186, 192 and 204, these multivibrators will have assumed their normal states when the recirculated pulse arrives at its respective OR gate 82 or 144.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. Apparatus for measuring the volume of water extracted from an oil/water separator comprising:
    a settling tank having an oil/water emulsion fluid outlet conduit and a free water fluid outlet conduit;
    a first fluid flowmeter disposed in said emulsion outlet conduit for generating a first series of electrical pulses having a frequency related to the flow of fluid through said conduit;
    a capacitance probe disposed in said emulsion conduit for detecting the dielectric constant of the fluid flowing in said conduit;
    means responsive to said first flowmeter and to said probe for generating a first series of electrical pulses related in number to the water flowing in said emulsion conduit;
    a second fluid flowmeter disposed in said free water outlet conduit for generating a second series of electrical pulses having a frequency related to the flow of fluid in said conduit;
    means for totalizing pulses;
    means for delaying the pulses in said first and second series of electrical pulses;
    first gating means for applying the delayed pulses in said first series of electrical pulses to said totalizing means when enabled and for otherwise inhibiting the application of the delayed pulses in said first series of electrical pulses to said totalizing means;
    second gating means for applying the delayed pulses in said second series of electrical pulses to said totalizing means when enabled and for otherwise inhibiting the application of the delayed pulses in said second series of electrical pulses to said totalizing means;
    third gating means for recirculating the delayed pulses of said first series of electrical pulses to said delaying means when enabled and for otherwise inhibiting the recirculation of the delayed pulses in said first series of electrical pulses to said delaying means;
    fourth gating means for recirculating the delayed pulses of said second series of electrical pulses to said delaying means when enabled and for otherwise inhibiting the recirculation of the delayed pulses in said second series of electrical pulses to said delaying means;
    coincidence detecting means for detecting the coincidence of a recirculated pulse of said first series of electrical pulses with a recirculated pulse of said second series of electrical pulses, the coincidence of a pulse in said first series of electrical pulses with a recirculated pulse of said second series of electrical pulses, and the coincidence of a pulse in said second series of electrical pulses with a recirculated pulse in said first series of electrical pulses; and
    second coincidence detecting means for detecting the coincidence of the delayed pulses in said first and second series of electrical pulses, all of said gating means being enabled responsively to said first and second coincidence detecting means.

2. The apparatus of claim 1 wherein said delaying means includes means for delaying the pulses in one of said first and second series of electrical pulses for a period of time greater than the delay of the pulses in the other of said first and second series of electrical pulses.

3. Apparatus for summing the number of pulses in two series of electrical pulses comprising:
    means for generating first and second series of electrical pulses;
    means for delaying the pulses in said first and second series of electrical pulses;
    means for counting electrical pulses;
    first gating means for applying the delayed pulses in said first series of electrical pulses to said counting means when enabled and for otherwise inhibiting the application of the delayed pulses in said first series of electrical pulses to said counting means;
    second gating means for applying the delayed pulses in said second series of electrical pulses to said counting means when enabled and for otherwise inhibiting the application of the delayed pulses in said second series of electrical pulses to said counting means;
    third gating means for recirculating the delayed pulses of said first series of electrical pulses to said delaying means when enabled and for otherwise inhibiting the recirculation of the delayed pulses in said first series of electrical pulses to said delaying means;
    fourth gating means for recirculating the delayed pulses of said second series of electrical pulses to said delaying means when enabled and for otherwise inhibiting the recirculation of the delayed pulses in said second series of electrical pulses to said delaying means; and
    coincidence detecting means for detecting the coincidence of a pulse in said first series of electrical pulses with a pulse in said second series of electrical pulses, the coincidence of a pulse in said first series of electrical pulses with a recirculated pulse of said second series of electrical pulses, and the coincidence of a pulse in said second series of electrical pulses with a recirculated pulse in said first series of electrical pulses; and second coincidence detecting means for detecting the coincidence of the delayed pulses in said first and second series of electrical pulses, all of said gating means being enabled responsively to said coincidence detecting means.

4. The apparatus of claim 3 wherein said delaying means includes means for delaying the pulses in one of said first and second series of electrical pulses for a period greater than the pulses in the other of said first and second series of electrical pulses.

5. A method of measuring the volume of water extracted from an oil/water separator having an oil/water emulsion fluid outlet conduit and a free-water fluid outlet conduit comprising the steps of:
   a. generating a first series of electrical pulses related in frequency to the flow of free-water through the free-water outlet conduit of the oil/water separator;
   b. generating a second series of electrical pulses related in frequency to the flow of water through the oil/water emulsion outlet conduit of the oil/water separator;
   c. detecting the coincidence of a pulse in the first series of electrical pulses with a pulse in the second series of electrical pulses;
   d. generating a first delayed pulse responsively to each detection;
   e. counting one of the coincident pulses of the first and second series of electrical pulses;
   f. summing the noncoincident pulses of the first and second series of electrical pulses with the delayed pulses and the counted pulses over a period of time;
   g. delaying the pulses in the first series of electrical pulses for a first predetermined period of time;
   h. delaying the pulses in the second series of electrical pulses for a second predetermined period of time;
   i. detecting the coincidence of a delayed pulse in the first series of electrical pulses with a delayed pulse in the second series of electrical pulses;
   j. generating a second delayed pulse responsively to each detection of delayed pulse coincidence; and,
   k. adding to the sum the number of generated second delayed pulses and one of the coincident pulses of the delayed first and second series of electrical pulses over the same period of time.

6. A method of summing the number of pulses in a first and second series of electrical pulses comprising the steps of:
   a. detecting the coincidence of a pulse in the first series of electrical pulses with a pulse in the second series of electrical pulses;
   b. delaying the pulses in the first series of electrical pulses for a first predetermined period of time;
   c. delaying the pulses in the second series of electrical pulses for a second predetermined period of time;
   d. detecting the coincidence of a delayed pulse in the first series of electrical pulses with a delayed pulse in the second series of electrical pulses;
   e. counting a pulse of one of the first and second series of electrical pulses responsively to the detection of coincidence;
   f. delaying a pulse of the other of the first and second series of electrical pulses for later counting responsively to the detection of coincidence; and
   g. summing the non-coincident pulses of the first and second series of electrical pulses with the delayed pulses and the counted pulses over a period of time.

7. The method of claim 6 wherein the pulse of the other of the first and second series of electrical pulses delayed for later counting is delayed by recirculation for coincidence detection with a pulse in said one of the first and second series of electrical pulses.

* * * * *